(12) United States Patent
Knussman et al.

(10) Patent No.: US 6,460,623 B1
(45) Date of Patent: Oct. 8, 2002

(54) HYDRAULIC SYSTEM PROVIDING DOWN FORCE ON A WORK IMPLEMENT

(75) Inventors: Michael L. Knussman, East Peoria; Glen P. Running, Sycamore; Arlyn P. Wilcox, Rockford, all of IL (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 09/693,491

(22) Filed: Oct. 20, 2000

(51) Int. Cl.[7] .............................................. A01B 41/06
(52) U.S. Cl. ............................. 172/4; 172/315; 111/926
(58) Field of Search ................................ 111/200, 926; 91/420, 433, 461, 517, 518; 172/4, 315, 316, 3

(56) References Cited

U.S. PATENT DOCUMENTS

| | | | |
|---|---|---|---|
| 4,354,688 A | * 10/1982 | Swanson | |
| 4,372,193 A | 2/1983 | Hall | |
| 4,528,920 A | 7/1985 | Neumeyer | |
| 5,046,311 A | 9/1991 | Cartner | |
| 5,065,681 A | * 11/1991 | Hadley | |
| 5,163,518 A | 11/1992 | Foley | |
| 5,348,101 A | * 9/1994 | Fox et al. | |
| 5,485,797 A | 1/1996 | Green et al. | |
| 5,540,050 A | 7/1996 | Krupowicz | |
| 5,562,165 A | * 10/1996 | Janelle et al. | |
| 5,740,746 A | 4/1998 | Ledermann et al. | |
| 6,076,611 A | * 6/2000 | Rozendaal et al. | |
| 6,079,192 A | * 6/2000 | Rasmussen | |

FOREIGN PATENT DOCUMENTS

| | | |
|---|---|---|
| EP | 0221891 A1 | 11/1985 |
| EP | 0760199 A1 | 3/1997 |

* cited by examiner

Primary Examiner—Victor Batson
(74) Attorney, Agent, or Firm—Jeff A. Greene

(57) ABSTRACT

A hydraulic system (20) for controlling the seed/fertilizer supply system (10) and the down pressure on a plurality of individual row units (12). A secondary supply arrangement (60) interconnects a first control circuit (26) of supply system (10) with a second control circuit (28), when the row units (12) are in a float mode, to provide pressurized fluid for the down force on the row units (12) during operation.

11 Claims, 2 Drawing Sheets

HYDRAULIC SYSTEM PROVIDING DOWN FORCE ON A WORK IMPLEMENT

TECHNICAL FIELD

This invention relates generally to a hydraulic system and, more particularly, to providing a down force on an actuator connected to a work implement.

BACKGROUND ART

Planter row units are typically supported from a transverse frame by vertically spaced parallel arms, which permit each row unit to vertically pivot independently to follow ground contour. Down force on the furrow openers mounted on parallel arms is normally assisted with springs, and adjustments to the down force is made by adjusting the pressure of operating fluid supplied to a hydraulic adjustment cylinder. The adjustment cylinder applies force to a rock shaft or other pivotal arrangement that is connected to the row units. A hydraulic control circuit allows the operator to make adjustments to the down force as the soil conditions change during operation.

One such implement and control circuit is disclosed in U.S. Pat. 5,163,518 issued on Nov. 17, 1992 to Deere & Company. The control circuit disclosed in this patent uses an adjustable pressure control device positioned in series with the flow control valve. The operator sets the pressure control device to a specific operating pressure so that when the adjustment cylinder is actuated the desired down pressure is applied to the row units. Since the flow control valve is left in an operating position for extended periods of time excessive heat is introduced into the hydraulic system. This consumes large amounts of power, reducing the available power to other tractor systems.

The present invention is directed to overcoming one or more of the problems as set forth above.

DISCLOSURE OF THE INVENTION

In one aspect of the present invention a hydraulic system for a work implement that is towed by a work machine is provided. The hydraulic system includes a source of pressurized fluid. A first control valve is connected to the source of pressurized fluid. A second control valve is also connected to the source of pressurized fluid. A fluid motor is connected to the first control valve by a supply conduit and a return conduit. An actuator having a down force end is connected to the second control valve by a conduit and a lift end is connected to the second control valve by a conduit. A pressure responsive valve is disposed between the supply conduit and the down force end of the actuator and movable between a first position communicating the supply conduit with the down force end of the actuator and a second position blocking supply conduit from the down force end of the actuator.

In another aspect of the current invention a method for controlling operation of a work implement that has a seed/fertilizer supply system and a plurality of individual row units. The method includes the steps of actuating a fluid motor of a first control circuit for transporting seed/fertilizer from the seed/fertilizer supply system to the plurality of row units. Operating fluid is then supplied to a down force end of an actuator of a second control circuit for lowering the plurality of individual row units. A predetermined pressure is applied on the down force end of the actuator to apply down force on the plurality of individual row units. The plurality of rows units are then placed in a float mode. And last, communicating operating fluid from the first control circuit to the down force end of the actuator to maintain down force on the plurality of row units.

BEST MODE FOR CARRYING OUT THE INVENTION

Figure 1:
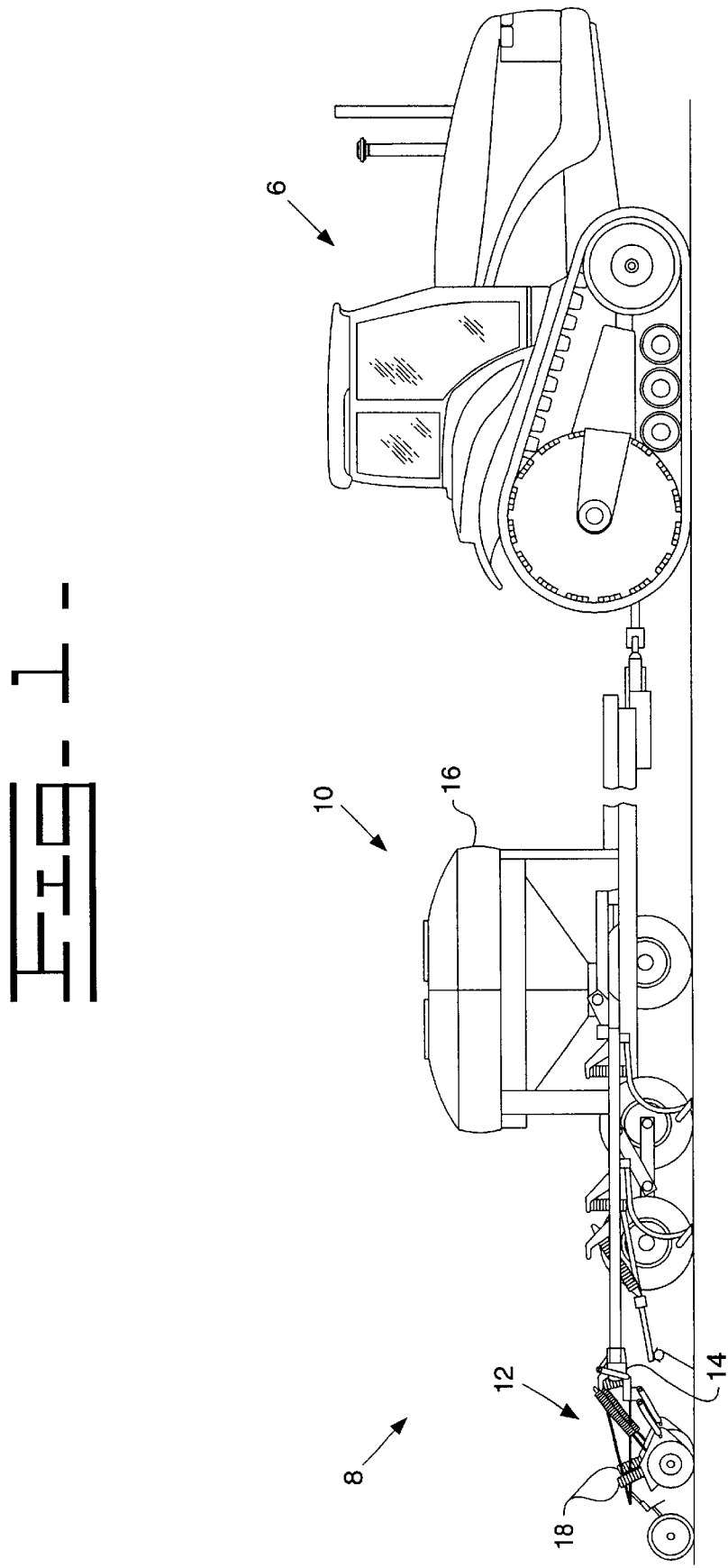
FIG. 1 shows a work machine pulling an implement embodying the hydraulic system of the present invention.

With reference to FIG. 1 a work machine 6 is shown towing an example of a work implement 8, such as, an air drill/seeder. The implement 8 has a seed/fertilizer supply system 10 positioned in front of a plurality of individual row units 12 (only one shown). The row units 12 are laterally spaced on a transversely extending main frame 14. During planting down force is exerted on the row units 12 to position them in relationship with the ground, and the seed/fertilizer is transported from a holding container 16 via distribution tubes 18 through the aid of a fan (not shown).

Figure 2:
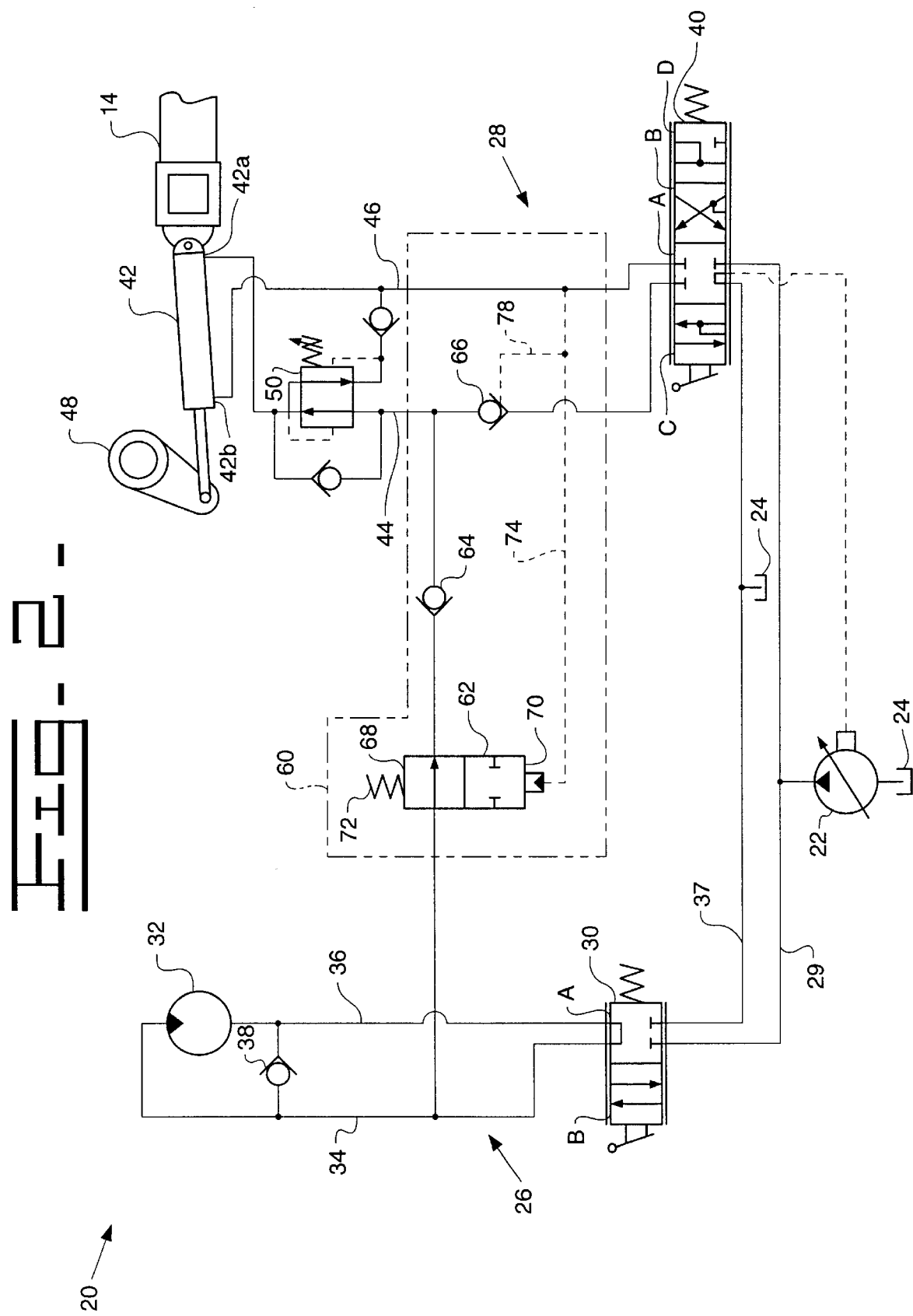
FIG. 2 is a schematic illustration of the present invention.

Referring now to FIG. 2, the implement 8 is controlled by a hydraulic system 20. Hydraulic system 20 includes a source of pressurized fluid, such as, a variable displacement load sensing pump 22 and a reservoir 24. Pump 22 supplies operating fluid to first and second circuits 26,28 through a supply conduit 29.

The first circuit 26 controls operation of the supply system 10 and typically operates at a pressure range of 8200 kPa–13800 kPa. First circuit 26 includes a control valve 30 that is in fluid communication with a fluid motor 32 for operating the fan, by conduits 34,36. Control valve 30 is movable between a neutral position "A" and an actuated position "B". At the neutral position "A" the pump 22 is blocked from communication with the fluid motor 32. At the actuated position "B" the pump 22 is in communication with the fluid motor 32 through conduit 34 allowing return fluid to be discharge to the reservoir 24 through a return conduit 37. Control valve 30 is specifically shown as being a manually operated two position valve however, it should be understood that valve 30 could be solenoid or pilot operated and selected from any of a number of commercially available valves.

Additionally, a check valve 38 is connected between conduits 34,36. Check valve 38 is positioned to allow flow of operating fluid from conduit 36 to conduit 34 allowing fluid make up in a run away situation and slow run down when operating fluid is blocked from motor 32. Conversely, check valve 38 blocks the flow of operating fluid from conduit 34 to conduit 36.

The second circuit 28 controls operation of the row units 12 and typically operates at a pressure range of 3500 kPa–8200 kPa. Second circuit 28 includes a control valve 40 that is in fluid communication with an actuator 42, by conduits 44,46. Actuator 42 is pivotally connected to the main frame 14 and a rockshaft 48. Rockshaft 48 is pivotally supported by the main frame 14 and connected with the row units 12. In cooperation with the actuator 42 the rockshaft 48 is used to raise, lower and apply down force on the individual row units 12. It should be understood that the actuator 42 could be connected to the main frame 14 and the rockshaft 48 in a reversed manner from that shown without departing from the spirit of the invention.

Control valve 40 is movable between a neutral position "A", and a lower/down force position "B", a lift position "C" and a float position "D". With control valve 40 in the neutral position "A", pump 22 is blocked from communication with actuator 42. At the lower/down force position "B" the pump 22 is in communication via conduit 44 with a head/down force end 42a of actuator 42. In this position return fluid from a rod/lift end 42b of the actuator 42 is discharged to the reservoir 24 via conduit 46 and return conduit 37. Conversely, at the lift position "C" the pump is in communication with the rod/lift end 42b of actuator 42 through conduit 46 and return fluid is discharged via conduit 44. At the float position "D" the pump 22 is blocked from communication with actuator 42 and conduits 44,46 are interconnected and in communication with the reservoir 24. Float position "D" of the control valve 40 is commonly referred to as a float position. It should be understood that other configurations are possible for the float position "D" but with any float position the head/lift end 42a of the actuator 42 should be connected to the reservoir 24. Control valve 40 is shown as being a manually operated four position valve however, it should be understood that valve 40 could be solenoid or pilot operated and selected from any of a number of commercially available valves.

A pressure reducing valve 50 is connected to conduits 44,46 and positioned in series with the head/down force end 42a of actuator 42. The pressure reducing valve 50 is used to adjustably set the upper limit of pressure on the head/down force end 42a of actuator 42. The pressure reducing valve 50 also provides another function. When implement 8 is in operation if the force exerted on row units 12 by the ground becomes to great the pressure reducing valve 50 will actuate dumping fluid back to the reservoir 24. It should be understood that any of a number of single valves or a combination of valves could be used to provide the dual function of the pressure reducing valve 50.

A secondary supply arrangement 60 is provided that connects the first and second circuits 26,28. The secondary supply arrangement 60 includes a pressure responsive valve 62, a first check valve 64 and a second check valve 66. The pressure responsive valve 62 is positioned between and connected to conduit 34 before check valve 38 and the head/down force end 42a of actuator 42 by conduit 44 before the pressure reducing valve 50. The pressure responsive valve 62 is movable between a first position allowing communication from conduit 34 to conduit 44 and a second position blocking communication from conduit 34 to conduit 44. Valve 62 has opposite ends 68,70, a spring 72 disposed at the end 68 biasing the spool to the first position, and a pilot line 74 communicating conduit 46 with end 70. The pressure responsive valve 62 is moved to its second position when the fluid pressure in the rod/lift end 42b of actuator 42 exceeds a predetermined value.

The first check valve 64 is connected between conduit 44 and the pressure responsive valve 62. First check valve 64 is positioned to allow communication from the pressure responsive valve 62 to conduit 44 and block communication in the opposite direction. The second check valve 66 is connected to conduit 44 between the control valve 40 and the connection to the pressure responsive valve 62. Second check valve 66 is positioned to allow communication from control valve 40 to the actuator 42 and block communication in the opposite direction. A pilot signal line 78 is connected to pilot line 74 and opens the second check valve 66 when the pressure in the pilot line 74 exceeds the pressure in the rod/down force end of the actuator 42.

INDUSTRIAL APPLICABILITY

In operation when the work machine 6 enters the field to be planted the row units 12 are in the raised position with the control valves 30,40 both in the neutral or "A" positions. The operator then sequences the hydraulic system 20 in the following manner.

First, the operator starts the fluid motor 32 of the seed supply system 10 by shifting control valve 30 to the actuated or "B" position. This rotates the fan and starts a supply of seed/fertilizer to be transported through distribution tubes 18 from container 16 to the row units 12. The row units 12 are then lowered by shifting control valve 40 to the lower/down force or "B" position. The first check valve 64 of the secondary supply arrangement 60 checks flow of operating fluid from control valve 40 to the fluid motor 32. If check valve 64 were not present lowering of the row units 12 would slow and fluid motor 32 would over speed. Control valve 40 is held in the "B" position until the upper limit of pressure is obtained actuating pressure reducing valve 50 dumping excess fluid to reservoir 24.

The control valve 40 is then shifted to the float or "D" position. With the control valve 40 in the float position operating fluid from the first control circuit 26 flows from conduit 34 to conduit 44 and maintains pressure on the rod/down force end 42a of actuator 42. The second check valve 66 of the secondary supply arrangement 60 checks the flow of operating fluid from the first control circuit 26 from simply returning to the reservoir 24.

The row units 12 are raised by shifting control valve 40 to the lift or "C" position. As the row units 12 are being raised operating fluid communicated through pilot line 74 shifts the pressure responsive valve 50 to the second position. With the pressure responsive valve 50 in the second position the first control circuit 26 is isolated from the second control circuit 28. Thus, maintaining raise time of the row units 12 and speed of the fluid motor 32 preventing clogging of the distribution tubes 18. Operation fluid is also communicated through pilot signal line 78 to the second check valve 66 allowing fluid from the rod/down force end 42a of actuator 42 to drain to the reservoir 24.

Other aspects, objects, and features of the present invention can be obtained from a study of the drawings, the disclosure, and the appended claims.

What is claimed is:

1. A hydraulic system for a work implement (8) towed by a work machine (6) comprising:

a source of pressurized fluid (22);

a first control valve (30) being connected to said source of pressurized fluid (22);

a second control valve (40) being connected to said source of pressurized fluid (22);

a fluid motor (32) being connected to said first control valve (30) by a supply conduit (34) and a return conduit (36);

an actuator (42) having a down force end (42a) being connected to said second control valve (40) by a conduit (44) and a lift end (42b) being connected to said second control valve (40) by a conduit (46);

a pressure responsive valve (62) disposed between the supply conduit (34) and the down force end (42a) of said actuator (42) and movable between a first position communicating the supply conduit (34) with the down force end (42a) of said actuator (42) and a second position blocking the supply conduit (34) from the down force end of said actuator (42); and said pressure responsive valve (62) having first and second ends (68,70), a spring (72) disposed at the first end (68) biasing the pressure responsive valve (62) to the first position and a pilot line (74) communicating the lift end (42b) of the actuator (42) with the second end (70).

2. The hydraulic system (20) of claim 1 wherein the pressure responsive valve (62) is connected to one of the work machine (6) and the work implement (8).

3. A The hydraulic system (20) of claim 1 wherein the pressure responsive valve (62) is moved to its second position when the fluid pressure in pilot line (74) is at a predetermined level.

4. The hydraulic system (20) of claim 1 including a first check valve (64) disposed between the pressure responsive valve (62) and the down force end (42a) of the actuator (42) and positioned to block communication from the down force end (42a) of the actuator (42) to the pressure responsive valve (62).

5. The hydraulic system (20) of claim 1 including a second check valve (66) disposed in conduit (44) between the control valve (40) and the connection to the pressure responsive valve (62) and positioned to block communication from pressure responsive valve (62) and the down force end (42a) of actuator (42).

6. The hydraulic system (20) of claim 5 wherein said second check valve (66) includes a pilot signal line (78) being connected to pilot line (74).

7. A secondary supply arrangement (60) of a hydraulic system (20) adapted for controlling a work implement (8) towed by a work machine (6), said secondary supply arrangement (60) supplying pressurized fluid from a first control circuit (26) having a first control valve (30) being connected to a fluid motor (32) by a supply conduit (34) and a return conduit (36) to a second control circuit (28) having a second control valve (40) being connected to an actuator (42) having a down force end (42a) and a lift end (42b) comprising:

a pressure responsive valve (62) disposed between supply conduit (34) and the down force end (42a) of actuator (42) and movable between a first position communicating the supply conduit (34) with the down force end (42a) of the actuator (42) and a second position blocking supply conduit (34) from the down force end (42a) of the actuator (42), said pressure responsive valve (62) having first and second ends (68,70), a spring (72) disposed at the first end (68) biasing the pressure responsive valve (62) to the first position, and a pilot line (74) communicating the lift end (42b) of the actuator (42) with the second end (70); and said secondary supply arrangement (60) being connected to one of the work machine (6) and the work implement (8).

8. The secondary supply arrangement (60) of claim 7 wherein the pressure responsive valve (62) is moved to its second position when the fluid pressure in pilot line (74) reaches at a predetermined level.

9. The secondary supply arrangement (60) of claim 7 including a first check valve (64) disposed between the pressure responsive valve (62) and the down force end (42a) of the actuator (42) and positioned to block communication from the down force end (42a) of the actuator (42) to the pressure responsive valve (62).

10. The secondary supply arrangement (60) of claim 7 including a second check valve (66) disposed in conduit (44) between the control valve (40) and the connection to the pressure responsive valve (62) and positioned to block communication from pressure responsive valve (62) and the down force end (42a) of actuator (42).

11. The secondary supply arrangement (60) of claim 10 wherein said second check valve (66) includes a pilot signal line (78) being connected to pilot line (74).

* * * * *